Aug. 3, 1965                F. L. DAHL ET AL                3,198,028
                            GEAR HEAD ASSEMBLY

Filed Nov. 16, 1961                                    2 Sheets-Sheet 1

INVENTORS
FREDERICK L. DAHL
JAMES H. HOKE
BY           STANLEY COHEN

OSTROLENK, FABER, GERB & SOFFEN
ATTORNEYS

Aug. 3, 1965 F. L. DAHL ET AL 3,198,028
GEAR HEAD ASSEMBLY
Filed Nov. 16, 1961 2 Sheets-Sheet 2

INVENTORS
FREDERICK L. DAHL
JAMES H. HOKE
BY STANLEY COHEN

OSTROLENK, FABER, GERB & SOFFEN
ATTORNEYS

United States Patent Office 3,198,028
Patented Aug. 3, 1965

3,198,028
GEAR HEAD ASSEMBLY
Frederick L. Dahl, Ringoes, N.J., and James H. Hoke, Bedminister, and Stanley Cohen, Elkins Park, Pa., assignors to Kollsman Instrument Corporation, Elmhurst, N.Y., a corporation of New York
Filed Nov. 16, 1961, Ser. No. 152,731
4 Claims. (Cl. 74—409)

My present invention relates to a gear head assembly and more particularly to a structure for assembling and mounting a gear train which will permit maximum accuracy in the transmission of motion.

In certain types of motion transmission, even a minute inaccuracy in the rotation of gears or undesired or uncompensated back-lash will diminish or so interfere with the function of the of the basic device as to make it unusable.

In synchros where motion transmission is accomplished with great accuracy by electrically positioning an armature to match the position of another armature, any inaccuracy in the mechanism which mechanically responds to the position of the first armature or in the mechanism which positions the second armature will destroy the effectiveness of the synchro system.

In particular, in the assembly of gears, while the gears and their shafts may be accurately constructed, great difficulty arises when the shafts are aligned owing to the fact that bearing openings or supports for the gear shafts must also be accurately aligned. This problem has contributed greatly to the expense of gear head assemblies for accurate output and has in fact made the gear head far more costly than it should be in relation to the cost of other components.

My invention contemplates the construction and arrangement of a gear head assembly wherein the parallel end plates of the cage supporting the gears are machined or cast integrally with a plurality of legs which space them appropriately and ensure that the parallel arrangement will be permanently maintained. By making the cage in one piece, subsequent machining operations are materially reduced since the end plates can be machined in a single set-up thereby assuring concentricities, alignments and parallelism within close limits. After the required surfaces have been machined, the bearing holes may be bored and support and other openings may be made or tapped as desired. The precision of the boring operation, which now can be performed in the same set-up, will largely eliminate back-lash in the gears.

Further, the one piece construction of the cage eliminates the inherent weakness of plate and post construction and the difficulties in manufacture and assembly. In all sizes of gear head assemblies, this arrangement permits load capabilities two to three times the load capabilities of comparable designs. In a size 10 frame this gear box will withstand 50 in. oz. torque continuously and 100 in. oz. momentary torque.

The primary object of my invention is the provision and arrangement of a novel gear head assembly.

A corollary object of my invention is the arrangement of a gear cage wherein the end plates are integral with the spacing members.

A further object of my invention is the provision of a gear cage wherein exact concentricities, alignments and parallelism of the end plates and the gears will be maintained.

Another object of my invention is the provision of a gear head assembly having a gear cage supporting gears with a minimum of back-lash.

The foregoing and many other objects of my invention will become apparent in the following description and drawings in which.

Figure 1:
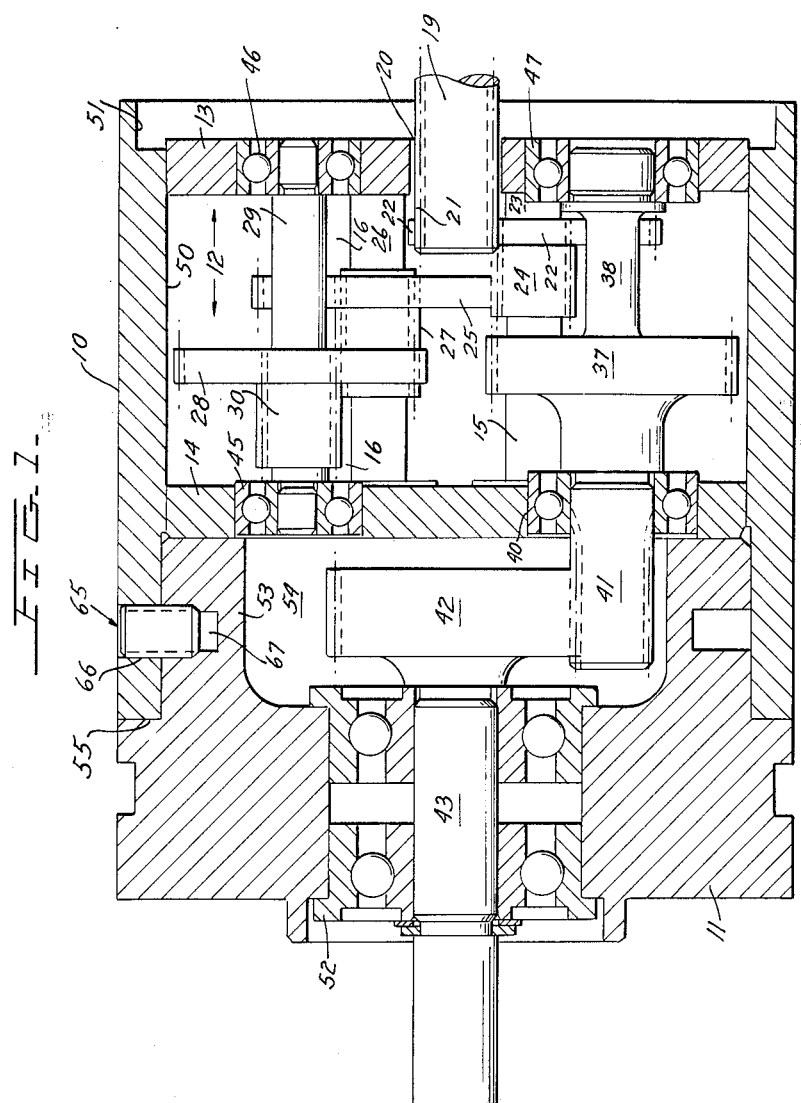
FIGURE 1 is a view partly in cross-section of my novel gear head assembly taken from line 1—1 of FIGURE 2.
Figure 2:
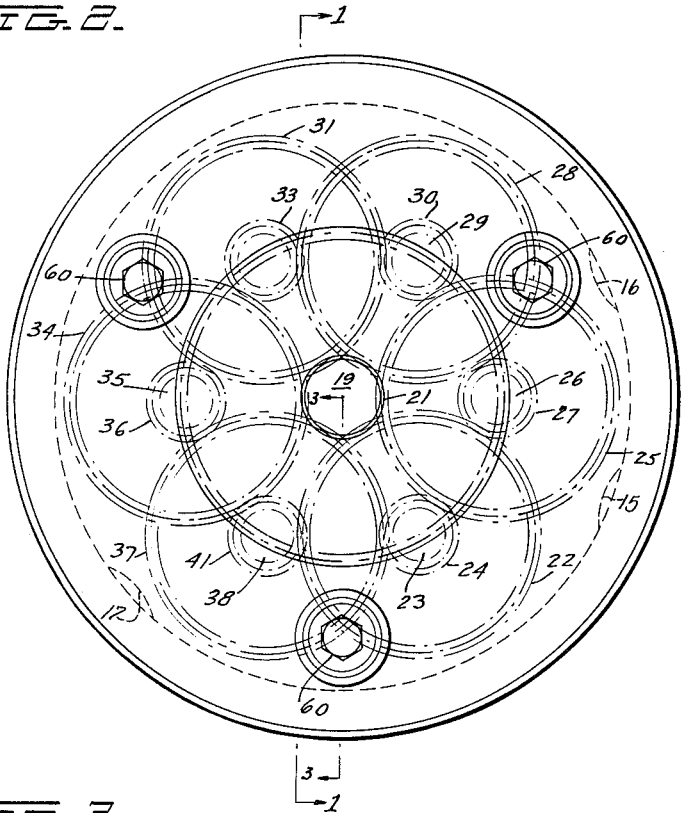
FIGURE 2 is an end view of my novel gear head assembly.
Figure 3:
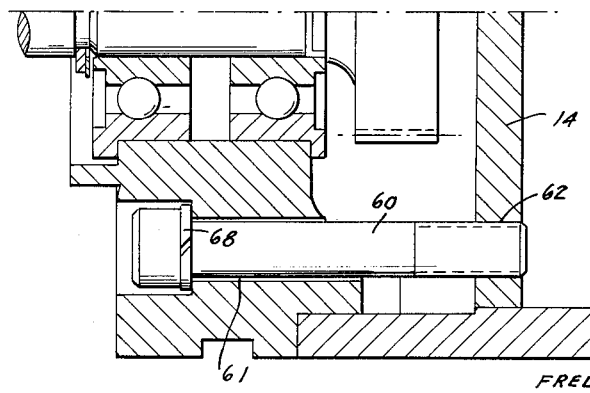
FIGURE 3 is a fragmentary view in cross-section corresponding to the lower left corner of FIGURE 1 but taken on a different radius, on line 3—3 of FIGURE 2.

Referring ot the figures, my novel gear head assembly comprises a housing 10, a head member 11 and a cage 12. The cage 12 comprises the end plates 13, 14 which are parallel to each other and secured and spaced by three legs 15, 16 and 17, in this instance, two of which, legs 15 and 16, may be seen in FIGURE 1. Legs 15, 16 and 17 are cast or machined integral with end plates 13, 14.

This integral arrangement provides the assurances of concentricity, alignment and parallelism previously pointed out and provides a unitary structure where the bearing diameters in both end plates 13, 14 may be bored in the same set-up thereby assuring absolute accuracy.

Thus, the bearing openings for shafts 19, 23, 26, 29, 32, 35 and 38 may be bored in the same set up in plates 13 and 14.

Keeping in mind that the particular number of gears and their particular relationship to provide the desired output torque and speed may vary from application to application, the specific gear train here used will be briefly described preliminary to describing the shaft mountings which are made possible by my invention. Input shaft 19 (which may be the output shaft of a pinion driving motor) entering cage 12 through opening 20 in end plate 13 has gear teeth 21 which mesh with and drive gear 22 on shaft 23. Shaft 23 carries gear 24 which drives gear 25 on shaft 26; shaft 26 carries gear 27 which drives gear 28 on shaft 29; shaft 29 carries gear 30 which drives gear 31 on shaft 32; shaft 32 has gear 33 which drives gear 34 on shaft 35; shaft 35 has gear 36 which drives gear 37 on shaft 38. Shaft 38 is extended beyond its bearing 40 in plate 14 to provide the cantilevered gear 41 which drives gear 42 on output shaft 43.

Shafts 29 and 38 are clearly visible in FIGURE 1. The bearings 45, 46 of shaft 29 and bearings 40, 47 of shaft 38 are clearly shown as mounted in aligned openings in opposite end plates 13, 14; these openings are originally formed in perfect alignment by reason of the integration of the end plates 13, 14 and legs 15, 16 and 17 as above described. The other shafts 23, 26, 32, 35 are mounted in similarly aligned bearings. The various gears are of course off-set along their respective shafts so that the gears are in appropriate planes to mesh only with their mating gears and not to engage other gears in the gear train.

The cylindrical housing 10 is provided with an opening of internal diameter 50 just sufficient to receive and position the plates 13 and 14 of cage 12. This opening is bored exactly concentric with the opening 51 of the housing 10 which is bored concentric with the bearing hole of the drive motor (not shown) from which drive pinion or shaft 19 emerges or to a mounting flange (not shown) on the drive motor; by this means concentricity is maintained between gear cage 12 and motor pinion 19 in order to provide proper engagement between motor pinion 19 and gear 22.

The gear head member 11 carrying output shaft 43 in bearing 52 is secured to the housing 10. Head member 11 is provided with the cylindrical extension 53 which enters the housing 10 and is slightly eccentric therewith to provide for a backlash adjustment, as fully set forth below. Extension 53 also provides a recess 54 for gear 42, and also defines flange 55 which bears against the edge of the housing 10. The method of securement of head member 11 to the housing provides the major adjustment means for reducing or obviating backlash in the entire gear train.

This is so because the largest component of backlash occurs at connection between gears 41, 42.

Let $B_t o$ equal the total backlash of the system and B1, 2, 3 . . . N = the linear backlash at each mesh, with B6 the backlash at the output stage, P1-2-3 . . . N = the pitch diameter of the pinions and G1-2-3 . . . N = the pitch diameters of the gears. Then $$B_t O = B6 + B5\left(\frac{P_5}{G_4}\right) + (B_3 + B_4)\left(\frac{P_4}{G_3}\right)\left(\frac{P_5}{G_4}\right) + \left(\frac{P_2}{G_1}\right)\left(\frac{P_3}{G_2}\right)\left(\frac{P_4}{G_3}\right)\left(\frac{P_5}{G_5}\right)$$

Therefore, assuming equal backlash at each mesh and the fraction $$\frac{Pn}{Gn-1} \text{ is } < 1$$

the largest component backlash occurs at the output mesh (B6).

The head member 11 is first loosely connected by screws 60 to plate 14 of cage 12. The three screws used pass through longitudinal openings 61 in head member 11 into tapped openings 62 in the plate 14 of the cage 12. The assembly of head member 11 and cage 12 is then inserted into housing 10.

By rotating the cage 12 and head member 11 with respect to each other, the backlash between gears 41 and 42 is compensated. The relationship between the diameters of holes 61 in the head member and the diameters of screws 60 will determine the extent of rotational adjustment which may be made. When the adjustment is made, the screws 60 are tightened against the lock washers 68 and the adjustment secured. Self tapping screws 65 are then inserted in openings 66 of the housing 10 and tightened in annular grooves 67 of head member extension 53 to secure the assembly in place.

By this means a simplified gear train is provided with accurate bearing arrangements, accurate alignment, concentricity and parallelism as well as a simplified easily made final backlash adjustment. Since many modifications and variations of our invention will now be obvious to those skilled in the art, we prefer to be bound, not by the specific disclosures herein contained, but only by the appended claims.

The embodiments of the invention in which an exclusive privilege or property is claimed are defined as follows:

1. A gear head assembly comprising a cylindrical housing; a gear cage in a first cylindrical formation of said housing and a head member supported in a second cylindrical formation of said housing, the longitudinal axes of said housing and gear cage coinciding; said gear cage having a pair of parallel plates integrally connected to a plurality of spacer members extending between the plates; openings in said plates, bearings in said openings; each of said openings in one plate being aligned with an opening in the opposite plate; a plurality of gear carrying shafts between said plates; said shafts each being rotatably supported in opposite aligned openings and an additional opening in one of the plates to receive a driving member; one of said shafts extending beyond the opposite plate to provide an output drive gear; an additional rotatable shaft carried by the head member; a gear on the portion of said shaft extending toward said cage; said output drive gear meshing with said gear on the shaft carried by said head member; the said last mentioned shaft extending beyond said head member to provide an output drive; said second cylindrical formation being slightly eccentric with respect to the longitudinal axis of the housing, whereby said shaft carried by the head and its gear are eccentrically positionable with respect to said longitudinal axis of the housing and the cage; adjustable connecting means for permitting a continuous rotatable adjustment between said housing member and said cage within a predetermined angular limit to adjust for backlash between said output drive gear and the gear carried by the shaft in said head member; and means for locking the cage and head to secure said adjustment.

2. A gear head assembly comprising a cylindrical housing; a gear cage in a first cylindrical formation of said housing and a head member supported in a second cylindrical formation of said housing, a third cylindrical housing formation, the longitudinal axes of said third cylindrical housing formation and said gear cage coinciding; said gear cage having a pair of parallel plates integrally connected to a plurality of spacer members extending between the plates; openings in said plates, bearings in said openings; each of said openings in one plate being aligned with an opening in the opposite plate; a plurality of gear carrying shafts between said plates; said shafts each being rotatably supported in opposite aligned openings and an additional opening in one of the plates to receive a driving member; said additional opening being adjacent said third cylindrical housing formation and in concentric alignment therewith; one of said shafts extending beyond the opposite plate to provide an output drive gear; an additional rotatable shaft carried by the head member; a gear on the portion of said shaft extending toward said cage; said output drive gear meshing with said gear on the shaft carried by said head member; the said last mentioned shaft extending beyond said head member to provide an output drive; said second cylindrical formation being slightly eccentric with respect to the longitudinal axis of the housing, whereby said shaft carried by the head and its gear are eccentrically positionable with respect to said longitudinal axis of the housing and the cage; adjustable connecting means for permitting a continuous rotatable adjustment between said housing member and said cage within a predetermined angular limit to adjust for backlash between said output drive gear and the gear carried by the shaft in said head member; and means for locking the cage and head to secure said adjustment.

3. A gear head assembly as set forth in claim 1, wherein said adjustable connecting means comprises angularly separated screw means transversely extending between oversized openings in one of said cage or head members, and snugly mating with the other of said cage or head members; the spacing between said screw means and oversized opening defining said predetermined angular limit.

4. A gear head assembly as set forth in claim 3 wherein said means for locking comprise an annular groove in said head member, in registry relationship with means entering said second cylindrical opening via angular separated openings in said housing extending generally along radii of said second opening.

References Cited by the Examiner

UNITED STATES PATENTS

| 1,202,782 | 10/16 | Blauvelt | 74—801 |
| 1,820,061 | 8/31 | Flagg | 74—801 |
| 3,011,358 | 12/61 | Moore | 74—409 |
| 3,091,131 | 5/63 | McNally | 74—606 |

DON A. WAITE, *Primary Examiner.*

BROUGHTON G. DURHAM, *Examiner.*